(12) United States Patent
Otomo et al.

(10) Patent No.: US 12,529,529 B2
(45) Date of Patent: Jan. 20, 2026

(54) HEAT EXCHANGE PROMOTION MEMBER AND HEAT EXCHANGER

(71) Applicants: Atago Manufacturing Co., Ltd., Kiryu (JP); The University of Tokyo, Tokyo (JP); DENSO CORPORATION, Kariya (JP)

(72) Inventors: Noboru Otomo, Kiryu (JP); Ken Yamamoto, Kiryu (JP); Kenichi Morimoto, Tokyo (JP); Yuji Suzuki, Tokyo (JP)

(73) Assignees: ATAGO MANUFACTURING CO., LTD., Gunma (JP); The University of Tokyo, Tokyo (JP); DENSO CORPORATION, Aichi (JP)

(*) Notice: Subject to any disclaimer, the term of this patent is extended or adjusted under 35 U.S.C. 154(b) by 0 days.

(21) Appl. No.: 18/908,257

(22) Filed: Oct. 7, 2024

(65) Prior Publication Data

US 2025/0027727 A1   Jan. 23, 2025

Related U.S. Application Data

(63) Continuation of application No. 17/629,887, filed as application No. PCT/JP2020/035727 on Sep. 23, 2020, now abandoned.

(30) Foreign Application Priority Data

Jul. 26, 2019 (JP) .................. 2019-137663

(51) Int. Cl.
*F28F 1/32* (2006.01)
*F28F 1/34* (2006.01)

(52) U.S. Cl.
CPC . *F28F 1/32* (2013.01); *F28F 1/34* (2013.01)

(58) Field of Classification Search
CPC ...................................... F28F 1/32; F28F 1/34
(Continued)

(56) References Cited

U.S. PATENT DOCUMENTS 3,515,207 A    6/1970  James
4,332,291 A *  6/1982  Mulock-Bentley ... F28D 1/0316
                                                  165/76
(Continued)

FOREIGN PATENT DOCUMENTS

CN    109470075 A    3/2019
DE        496733     4/1930
(Continued)

OTHER PUBLICATIONS

International Search Report dated Nov. 2, 2020, issued in counterpart International application No. PCT/JP2020/035727, with English translation. (12 pages).
(Continued)

*Primary Examiner* — Claire E Rojohn, III
(74) *Attorney, Agent, or Firm* — WHDA, LLP (57) ABSTRACT

Provided is a heat exchange promotion member and a heat exchanger that can improve heat transfer performance while holding down an increase in pressure drag of a fluid that exchanges heat with the heat exchange promotion member. A heat dissipation fin 14 of the present invention is a heat exchange promotion member that exchanges heat with a flowing fluid. The heat dissipation fin 14 includes a planar part 12 which is a surface substantially parallel to the fluid flowing direction and a raised part 13 that protrudes from the planar part 12 toward the fluid. The raised part 13 has a portion slanted relative to the direction in which the fluid flows, and there are a plurality of the raised parts 13 formed spaced apart from one another in the fluid flowing direction.

3 Claims, 11 Drawing Sheets

(58) Field of Classification Search
USPC .......................................................... 165/151
See application file for complete search history.

(56) References Cited

U.S. PATENT DOCUMENTS

| | | | | |
|---|---|---|---|---|
| 6,615,910 | B1* | 9/2003 | Joshi ..................... | F28F 3/02 |
| | | | | 257/722 |
| 6,749,817 | B1* | 6/2004 | Mulvaney, III .......... | B01J 19/32 |
| | | | | 422/615 |
| 6,889,759 | B2* | 5/2005 | Derosier .................. | F28F 1/32 |
| | | | | 165/181 |
| 7,159,649 | B2* | 1/2007 | Thyrum .................. | F28F 9/001 |
| | | | | 165/DIG. 399 |
| 7,475,719 | B2* | 1/2009 | Derosier ................ | F28F 17/005 |
| | | | | 165/182 |
| 8,291,724 | B2* | 10/2012 | Shikazono ............... | F28F 1/32 |
| | | | | 62/515 |
| 8,376,033 | B2* | 2/2013 | Robidou .................. | F28F 1/24 |
| | | | | 165/184 |
| 9,080,819 | B2* | 7/2015 | Nakano ................... | F28F 1/126 |
| 9,163,880 | B2* | 10/2015 | Shikazono ............... | F28F 1/42 |
| 9,891,008 | B2* | 2/2018 | Shikazono ............... | F28F 1/32 |
| 2003/0029608 | A1 | 2/2003 | Shimoya ................. | F28F 3/042 |
| | | | | 165/177 |
| 2008/0142201 | A1 | 6/2008 | Derosier et al. | |
| 2008/0264098 | A1* | 10/2008 | Shikazono ............... | F28F 1/32 |
| | | | | 165/171 |

FOREIGN PATENT DOCUMENTS

| | | |
|---|---|---|
| EP | 2299488 A1 | 3/2011 |
| JP | S55-105786 U | 7/1980 |
| JP | 56-149592 A | 11/1981 |
| JP | S58-83687 U | 6/1983 |
| JP | S62-123293 A | 6/1987 |
| JP | H02-309195 A | 12/1990 |
| JP | H04-76395 A | 3/1992 |
| JP | H05-17366 U | 3/1993 |
| JP | H07-63490 A | 3/1995 |
| JP | H08-170890 A | 7/1996 |
| JP | 2000193389 A | 7/2000 |
| JP | 3342121 B2 | 11/2002 |
| JP | 2008-128569 A | 6/2008 |
| JP | 2011-174676 A | 9/2011 |
| JP | 4815612 B2 | 11/2011 |
| JP | 5077926 B2 | 11/2012 |
| JP | 3199776 U | 9/2015 |
| JP | 2018-17465 A | 2/2018 |
| WO | 2007/013623 A1 | 2/2007 |
| WO | 2012/102053 A1 | 8/2012 |
| WO | 2014/077316 A1 | 5/2014 |

OTHER PUBLICATIONS

Written Opinion dated Aug. 3, 2021, issued in counterpart International application No. PCT/JP2020/035727. (9 pages).
Notice of Reasons for Refusal dated Aug. 6, 2024, issued in counterpart JP Application No. 2021-535475; with English Translation (18 pages).
Decision to Grant a Patent dated Sep. 10, 2024, issued in counterpart JP Application No. 2021-535475 with English Translation (6 pages).
Notice of Reason for Refusal dated Jul. 31, 2024, issued in Japanese Application No. 2021-535475 with English translation (18 pages).
Notice of Reasons for Refusal dated Nov. 17, 2023, issued in counterpart CN Application No. 202080054097.8 (7 pages).

* cited by examiner

HEAT EXCHANGE PROMOTION MEMBER AND HEAT EXCHANGER

CROSS-REFERENCE TO RELATED APPLICATIONS

This application is a continuation of U.S. application Ser. No. 17/629,887, filed on Jan. 25, 2022, which is a 371 of International Application No. PCT/JP2020/035727, filed on Sep. 23, 2020, which is based upon and claims the benefit of priority from the prior Japanese Patent Application No. 2019-137663, filed on Jul. 26, 2019, the entire contents of which are incorporated herein by reference.

TECHNICAL FIELD

The present invention relates to a heat exchange promotion member and a heat exchanger, and particularly to a heat exchange promotion member and a heat exchanger that can improve heat transfer performance while holding down an increase in the pressure drag of a fluid that exchanges heat with the heat exchange promotion member.

BACKGROUND ART

The history of heat exchanger development is long, and vast quantities of knowledge and know-hows have been accumulated to date regarding designing of heat-transfer surfaces and development of actual apparatuses, both domestically and internationally. However, currently, there are still challenges to overcome, which are achievement of an improvement in heat transfer rate that exceeds an increase in pressure loss by machining a heat transfer surface and designing of a heat exchanger taking not only heat transfer characteristics but also matter transport characteristics into account.

In a conventional heat exchanger, slits, louvers, or the like are formed on an extended heat transfer surface which is for example a fin. However, in many cases, attaining the leading edge effect or the front edge effect is accompanied by an increase in pressure drag due to flow separation, and hence increase in pressure loss greatly exceeds improvement in heat transfer rate. To improve the performance of a heat exchanger as a whole, the key is to increase the amount of heat exchange while holding down an increase in the power of a pump for obtaining a necessary flow amount.

Also, slitted fins or louvered fins having cut-away portions that induce deposition of dirt and dust cannot be used for outdoor heat exchangers used for a fuel cell, a gas/oil water heater, a heat pump water heater, and the like because such outdoor heat exchanges are greatly affected by attachment of dirt, dust, and the like that causes a decrease in the flow rate. There have therefore not been any effective heat transfer promotion approach. Moreover, it is particularly important to reduce condensation and frosting of a water component under low-temperature conditions such as a heat exchanger for heat pumps, a heat exchanger for air conditioners, and a heat exchanger for refrigerators. It is therefore believed that by developing and designing heat transfer surfaces considering the matter transport characteristics of dirt, dust, condensed water, and the like under forced convection, heat transfer promotion technology can be introduced to many energy systems the application of heat transfer promotion technology to which has heretofore been dropped.

Further, demands for lower costs are increasing for future expansion of the spread of fuel cell systems, and the above described challenges need to be overcome from a perspective of achieving compactness, which is directly linked to reduction in material costs. Also, hot water heat exchangers such as existing heat exchangers using plate fins are installed outdoors and are strongly affected by attachment of dirt and dust, and thus it is also important to overcome the above-described challenges.

Inventions for improving heat transfer characteristics of heat exchangers by modifying the shapes of heat exchange surfaces are described in the following patent documents.

CITATION LIST

Patent Literatures

Patent Literature 1: Japanese Utility Model Registration Application Publication No. Sho 55-105786
Patent Literature 2: Japanese Utility Model Registration Application Publication No. Sho 58-83687
Patent Literature 3: Japanese Patent Application Publication No. Hei 2-309195
Patent Literature 4: Japanese Patent No. 3342121
Patent Literature 5: Japanese Patent Application Publication No. Sho 62-123293
Patent Literature 6: Japanese Utility Model Registration No. 3199776
Patent Literature 7: Japanese Patent No. 4815612
Patent Literature 8: Japanese Patent No. 5077926

SUMMARY OF INVENTION

Technical Problem

Generally, heat transfer characteristics improve when bumpy deformations are added to a heat transfer surface, but then flow separation causes a large loss of pressure. An increase in pressure loss due to introduction of heat transfer promotion technology leads to a decrease in air volume with the same pump power, lowering the performance improving effect. Thus, an important technical challenge in developing high-performance heat exchangers is to design a heat transfer surface that maximizes heat transfer performance while holding down an increase in pressure loss. Further, when the working fluid is outdoor air or combustion exhaust gas, it is required to reduce clogging due to deposition of dirt, dust, soot, or the like, and it is essential to develop a new heat transfer surface that replaces the conventional slitted or louvered fins. Although many heat exchangers have been developed domestically and internationally, a new approach based on a principle different from the conventional approaches is necessary in order to achieve heat transfer performance improvement exceeding pressure loss increase.

Figure 8:
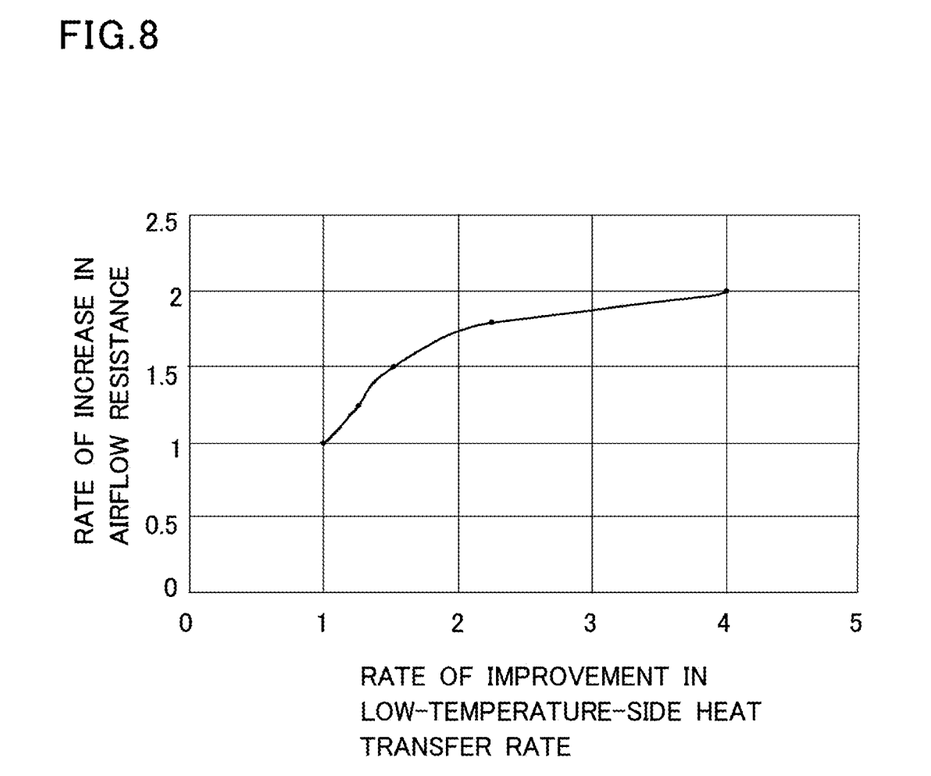
FIG. 8 is a graph showing the correlation between the rate of improvement in the low-temperature-side heat transfer rate and the rate of increase in airflow resistance.

A graph in FIG. 8 shows the relation between the rate of improvement in the low-temperature-side heat transfer rate and the rate of increase in airflow resistance in an heat exchanger. In this graph, the horizontal axis represents the rate of improvement in the low-temperature-side heat transfer rate, and the vertical axis represents the rate of increase in airflow resistance. The solid line in this graph indicates the border line where performance can be maintained equally, and in order to improve the performance of a heat exchanger, the rate of improvement in the low-temperature-side heat transfer rate and the rate of increase in airflow resistance need to be located under the portion indicated with the solid line in the graph.

The present invention has been made in view of such problems, and has an object to provide a heat exchange promotion member and a heat exchanger capable of improving heat transfer performance while holding down an increase in pressure drag of a fluid used for heat exchange.

Solution to Problem

A heat exchange promotion member according to the present invention is a heat exchange promotion member that exchanges heat with a flowing fluid, the heat exchange promotion member including: a planar part which is a surface substantially parallel to a direction in which the fluid flows; and a raised part that protrudes from the planar part toward the fluid, in which the raised part has a portion slanted relative to the direction in which the fluid flows, and there are a plurality of the raised parts formed spaced apart from one another in the direction in which the fluid flows.

In the heat exchange promotion member according to the present invention, the raised part alternately has a first raised portion slanted to one direction relative to the direction in which the fluid flows and a second raised portion slanted to a different direction relative to the direction in which the fluid flows.

In the heat exchange promotion member according to the present invention, an angle at which the raised part is slanted from a direction orthogonal to a flow of the fluid is from at least 30° to not greater than 80°.

In the heat exchange promotion member according to the present invention, a width of the raised part is from at least 0.6 mm to not greater than 4.5 mm.

In the heat exchange promotion member according to the present invention, the raised part protrudes from the planar part by a length of from at least 0.2 mm to not greater than 1.5 mm.

In the heat exchange promotion member according to the present invention, a cross section of the raised part at a tip end portion side is a substantially semicircular shape.

A heat exchanger to the present invention is a heat exchanger including: a plurality of heat dissipation fins that are arranged at constant intervals and exchange heat with a fluid; and a heat transfer tube that is thermally coupled with the heat dissipation fins and allows a heat medium to flow thereinside, the heat medium transporting heat energy, in which the heat dissipation fins each include a planar part which is a surface substantially parallel to a direction in which the fluid flows and a raised part that protrudes from the planar part toward the fluid, the raised part has a portion slanted relative to the direction in which the fluid flows, and there are a plurality of the raised parts formed spaced apart from one another in the direction in which the fluid flows.

In the heat exchanger according to the present invention, the raised part alternately has a first raised portion slanted to one direction along a flow of the fluid and a second raised portion slanted to a different direction along the flow of the fluid, and a portion where the first raised portion and the second raised portion are continuous with each other forms a substantially letter-V shape.

In the heat exchanger according to the present invention, the heat dissipation fins each have a first main surface and a second main surface that is opposite the first main surface, and the raised part is formed only on the first main surface side.

Effect of Invention

The present invention is a heat exchange promotion member that exchanges heat with a flowing fluid, the heat exchange promotion member including: a planar part which is a surface substantially parallel to a direction in which the fluid flows; and a raised part that protrudes from the planar part toward the fluid, in which the raised part has a portion slanted relative to the direction in which the fluid flows, and there are a plurality of the raised parts formed spaced apart from one another in the direction in which the fluid flows. According to such a heat exchange promotion member of the present invention in which the raised parts form wall shapes slanted relative to the direction in which the fluid flows, the fluid performs heat exchange while flowing on the surface of the heat exchange promotion member with its laminar flow state maintained. Thus, the rate of heat transfer between the fluid and the heat exchange promotion member can be improved while holding down an increase in flow resistance that the heat exchange promotion part exerts to the fluid.

In addition, in the heat exchange promotion member of the present invention, the raised part alternately has a first raised portion slanted to one direction relative to the direction in which the fluid flows and a second raised portion slanted to a different direction relative to the direction in which the fluid flows. According to such a heat exchange promotion member of the present invention in which the first raised portions and the second raised portions are slanted in different directions from each other, swirls with different rotation directions are alternately formed, which promotes heat transfer between the heat exchange promotion member and the fluid.

In addition, in the heat exchange promotion member of the present invention, an angle at which the raised part is slanted from a direction orthogonal to a flow of the fluid is from at least 30° to not greater than 80°. According to such a heat exchange promotion member of the present invention in which the raised part is slanted from the flow of the fluid in the predetermined angle range, suppression of flow resistance and improvement in heat transfer rate can both be achieved at a high level.

In addition, in the heat exchange promotion member of the present invention, a width of the raised part is from at least 0.6 mm to not greater than 4.5 mm. According to such a heat exchange promotion member of the present invention in which the raised part has a width within the above range, suppression of flow resistance and improvement in heat transfer rate can both be achieved at a high level.

In addition, in the heat exchange promotion member of the present invention, the raised part protrudes from the planar part by a length of from at least 0.2 mm to not greater than 1.5 mm. According to such a heat exchange promotion member of the present invention in which the protrusion height of the raised part is within the above range, suppression of flow resistance and improvement in heat transfer rate can both be achieved at a high level.

In addition, in the heat exchange promotion member of the present invention, a cross section of the raised part at a tip end portion side is a substantially semicircular shape. According to such a heat exchange promotion member of the present invention in which the cross section of the raised part at its tip end portion side is a substantially semicircular shape, flow separation is reduced, and suppression of flow resistance and improvement in heat transfer rate can both be achieved at a high level.

A heat exchanger of the present invention includes: a plurality of heat dissipation fins that are arranged at constant intervals and exchange heat with a fluid; and a heat transfer tube that is thermally coupled with the heat dissipation fins and allows a heat medium to flow thereinside, the heat medium transporting heat energy, in which the heat dissipation fins each include a planar part which is a surface substantially parallel to a direction in which the fluid flows and a raised part that protrudes from the planar part toward the fluid, the raised part has a portion slanted relative to the direction in which the fluid flows, and there are a plurality of the raised parts formed spaced apart from one another in the direction in which the fluid flows. According to such a heat exchanger of the present invention in which the raised parts form wall shapes slanted relative to the direction in which the fluid flows, the fluid performs heat exchange while flowing on the surface of the heat exchange promotion member with its laminar flow state maintained. Thus, the rate of heat transfer between the fluid and the heat exchange promotion member can be improved while holding down an increase in flow resistance that the heat exchange promotion part exerts to the fluid.

In addition, in the heat exchanger of the present invention, the raised part alternately has a first raised portion slanted to one direction along a flow of the fluid and a second raised portion slanted to a different direction along the flow of the fluid, and a portion where the first raised portion and the second raised portion are continuous with each other forms a substantially letter-V shape. According to such a heat exchanger of the present invention in which the portion where the first raised portion and the second raised portion are continuous with each other forms a substantially letter-V shape, a flow moving around to the back of the heat transfer tube is generated, decreasing a wake behind the heat transfer tube. Thus, by a drastic decrease in pressure drag, an increase in pressure loss is held down.

In addition, in the heat exchanger of the present invention, the heat dissipation fins each have a first main surface and a second main surface that is opposite the first main surface, and the raised part is formed only on the first main surface side. According to such a heat exchanger of the present invention, the friction drag on the first main surface side can be made larger than the friction drag on the second main surface side, and the flows of fluid in a direction perpendicular to the main surfaces of the heat dissipation fin becomes asymmetrical. Thus, the flow moving around to the back of the heat transfer tube can be increased even more to decrease a wake behind the heat transfer tube, and also, pressure drag (profile drag) due to flow separation can be reduced even more.

BRIEF DESCRIPTION OF DRAWINGS

FIG. 1 is a diagram showing a heat exchanger including a heat exchange promotion member according to an embodiment of the present invention, FIG. 1A being a view of the heat exchanger seen in the Y direction and FIG. 1B being a view of the heat exchanger seen in the Z direction.

FIG. 3 is a diagram showing a raised part formed at the heat dissipation fin according to the embodiment of the present invention, FIG. 3A being a view of the raised part seen in the Y direction and FIG. 3B being a sectional view taken along a cutting-plane line A-A in FIG. 3A.

FIG. 4 is a diagram showing the heat dissipation fin according to the embodiment of the present invention, FIG. 4A being a perspective view of the heat dissipation fin and FIG. 4B being a sectional view showing the flow of fluid in the vicinity of the upper surface of the heat dissipation fin.

FIG. 5 is a diagram showing the heat dissipation fin according to the embodiment of the present invention, FIG. 5A being a diagram showing the distribution of friction coefficient at the lower surface of the heat dissipation fin and FIG. 5B being a diagram showing the distribution of friction coefficient at the upper surface of the heat dissipation fin.

FIG. 7 is a diagram showing the heat dissipation fin according to the embodiment of the present invention, FIG. 7A being a graph showing the relation between a Reynolds number and a j-factor and FIG. 7B being a graph showing the relation between a Reynolds number and an f-factor.

FIG. 9 is a diagram showing a heat exchanger including heat exchange promotion members according to another embodiment of the present invention, FIG. 9A being a view of the heat exchanger seen in the Y direction and FIG. 9B being a view of the heat exchanger seen in the X direction.

FIG. 10 is a diagram showing a heat exchanger including heat exchange promotion members according to yet another embodiment of the present invention, FIG. 10A being a perspective view and FIG. 10B being a sectional view.

FIG. 11 is a diagram showing a state where heat exchange promotion members according to still another embodiment of the present invention are housed in a casing, FIG. 11A being a perspective view and FIG. 11B being a top view showing the heat exchange promotion member.

DESCRIPTION OF EMBODIMENTS

An embodiment of the present invention is described in detail below based on the drawings. Although the following description shows an example where a heat exchange promotion member according to the present embodiment is used in a fin-and-tube heat exchanger, the heat exchange promotion member of the present embodiment can also be used in heat exchangers of other modes. For example, the heat exchange promotion member of the present embodiment can be used in, e.g., a plate heat exchanger or a heat transfer surface of a heat exchanger having a rectangular flow channel, which is specifically a heat transfer surface of an EGR cooler. In the following description, the X direction is a direction parallel to the direction in which a fluid flows, the Y direction is the direction of the thickness of a heat dissipation fin 14, and the Z direction is a direction orthogonal to the X direction and the Y direction.

Figure 1A:
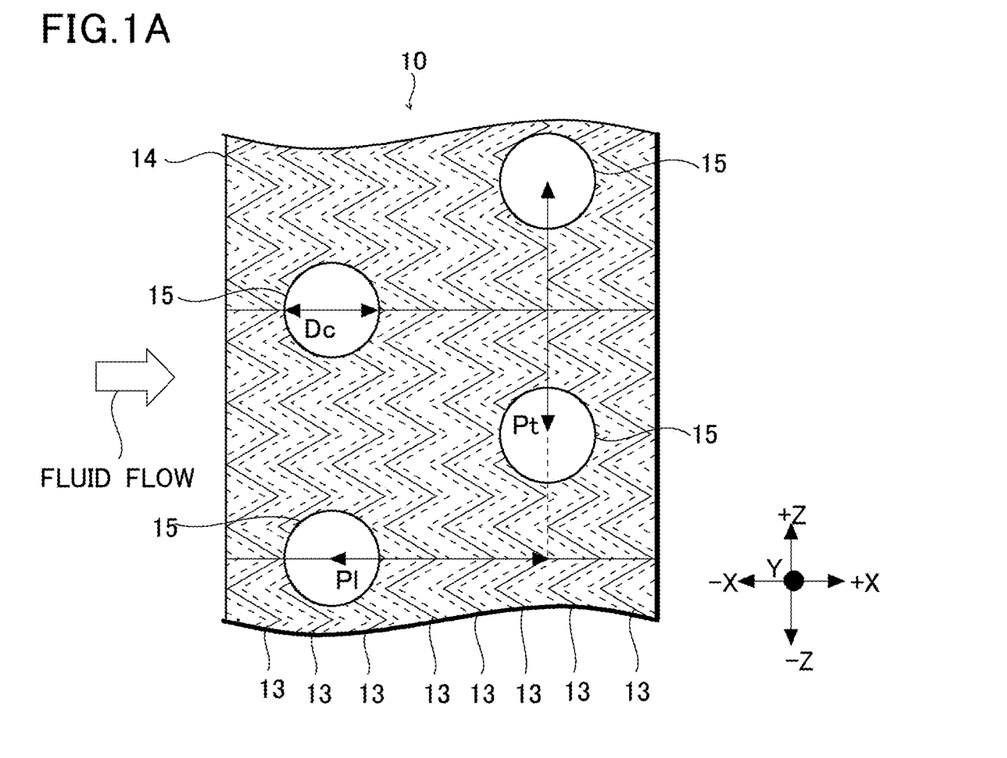
Figure 1B:
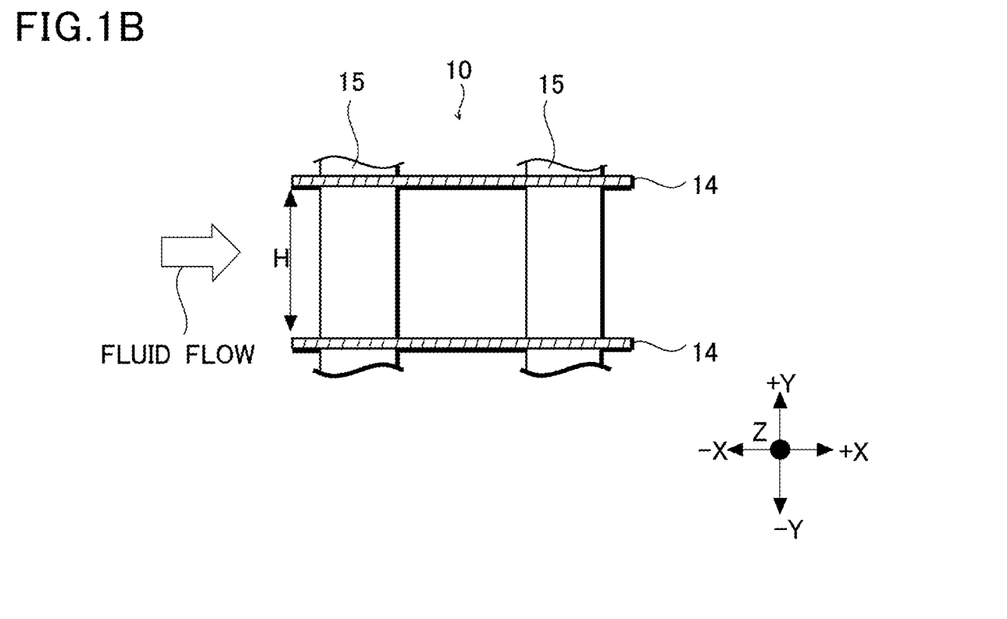

The configuration of a heat exchanger 10 is described with reference to FIG. 1. FIG. 1A is a view of the heat exchanger 10 seen in the Y direction, and FIG. 1B is a view of the heat exchanger 10 seen in the Z direction. In FIG. 1A, a fluid is flowing in the X direction.

Referring to FIG. 1A, the heat exchanger 10 is formed of a plurality of heat dissipation fins 14 and heat transfer tubes 15. The heat exchanger 10 is a device for exchanging heat between a fluid that flows through between the heat dissipation fins 14 and a heat medium that flows through the inside of the heat transfer tubes 15. The heat exchanger 10 is used as, for example, an outdoor compact heat exchanger that enables a household solid oxide fuel cell (SOFC) system to be driven continuously for a long period of time. Further, the heat exchanger 10 can also be used for a room air conditioner, a heat pump water heater, a gas water heater, an oil water heater, and the like.

Various kinds can be used as the fluid to exchange heat with the heat dissipation fins 14, including a liquid such as water or a gas such as air. Also, various kinds can be used as the heat medium that flows through the inside of the heat transfer tubes 15, including a gas such as air, a liquid such as water, or a refrigerant used in a refrigeration cycle such as a vapor compression refrigeration cycle.

Each heat dissipation fin 14 is, for example, a plate member made of, e.g., metal with an excellent heat transfer rate, such as copper or aluminum, and here has a substantially rectangular shape with its long sides extending vertically. A large number of heat dissipation fins 14 are arranged at substantially equal intervals in their thickness direction. The heat dissipation fin 14 is one mode of a heat exchange promotion member and has an extended heat transfer surface.

Raised parts 13 are formed at each heat dissipation fin 14. The raised parts 13 are wall-shaped portions formed by partially protruding the heat dissipation fin 14 and extend in the Z direction in a meandering form. In FIG. 1A, the portion where the raised part 13 protrudes the most, i.e., a ridgeline, is indicated by a solid line. Also, a border between a flat portion and the raised part 13 of the heat dissipation fin 14 is indicated by a dotted line. There are a plurality of the raised parts 13 formed at substantially equal intervals, arranged in the X direction in which the fluid flows, and the raised parts 13 have substantially the same shape as one another. A detailed description of the shape of the raised part 13 will be given with reference to FIG. 3.

The heat transfer tubes 15 are tubular members made of metal with a high heat transfer rate such as copper and aluminum and have a meandering shape. By penetrating through the heat dissipation fin 14, the heat transfer tubes 15 are thermally coupled with the heat dissipation fin 14 at the penetration portions. Also, the heat transfer tubes 15 are arranged in a zigzag manner relative to the X direction in which the fluid flows.

Now, examples are given as to the sizes of the members forming the heat exchanger 10. As shown in FIG. 1A, the diameter DC of the heat transfer tube 15 is 10 mm, a pitch Pl between the heat transfer tubes 15 measured in the X direction in which the fluid flows is 22 mm, and a pitch Pt between the heat transfer tubes 15 measured in the Z direction orthogonal to the flow of fluid is 25.4 mm. Further, as shown in FIG. 1B, a distance H by which the heat dissipation fins 14 are spaced apart from each other in the Y direction is 1.82 mm, and thus, the heat dissipation fins 14 can be sufficiently spaced apart from each other, which can inhibit clogging of dirt, dust, and the like.

The diameter DC of the heat transfer tube 15 is the same as the diameter of a hole portion 16 (see FIG. 2) formed in the heat dissipation fin 14. The pitch PI between the heat transfer tubes 15 measured in the X direction in which the fluid flows is the same as the pitch between the hole portions 16 measured in the X direction in which the fluid flows. The pitch Pt between the heat transfer tubes 15 measured in the Z direction orthogonal to the flow of fluid is the same as the pitch between the hole portions 16 measured in the Z direction orthogonal to the flow of fluid.

Figure 2:
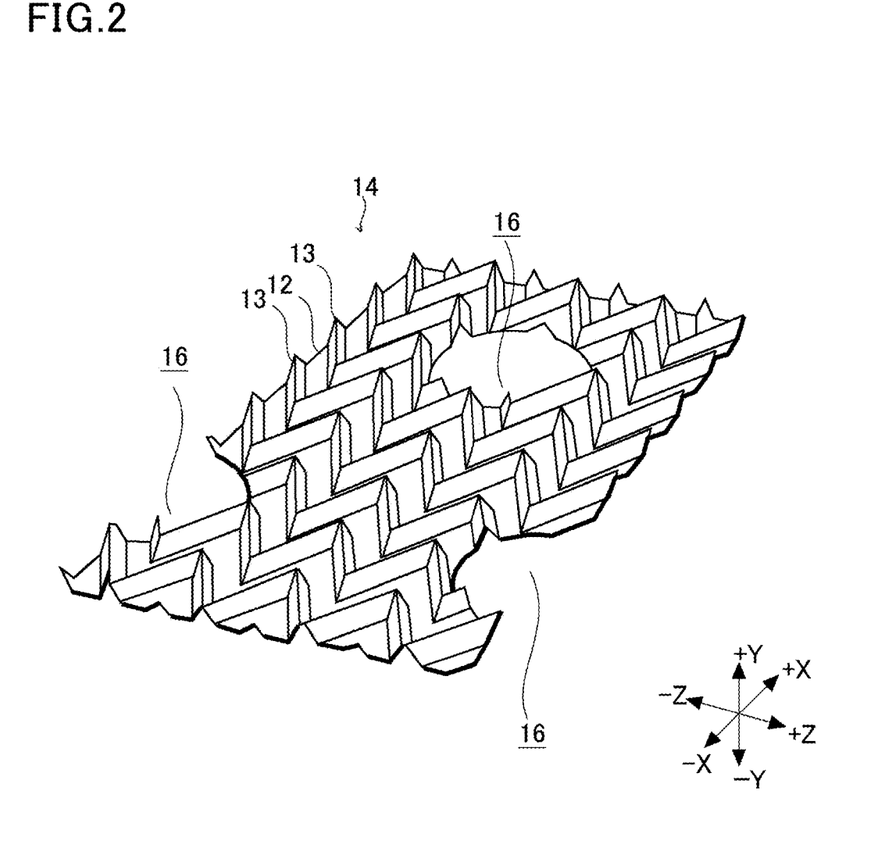
FIG. 2 is a perspective view of a heat dissipation fin according to the embodiment of the present invention.

With reference to FIG. 2, the configuration of the heat dissipation fin 14 is described in detail. The heat dissipation fin 14 is, as described earlier, formed of a plate of metal that transfers heat well such as copper or aluminum, and has substantially circular hole portions 16 formed at the above-described portions where the heat transfer tubes 15 penetrate.

The heat dissipation fin 14 is a heat exchange promotion member that promotes heat exchange between the fluid and the heat medium described above. To promote heat exchange further, the heat dissipation fin 14 has the raised parts 13 formed thereat.

The raised parts 13 are portions formed by protruding part of the heat dissipation fin 14 in the +Y direction. As a whole, the raised part 13 forms a meandering wall parallel to the Z direction, which is a direction orthogonal to the X direction which is the flowing direction in which the fluid flows. Locally, the raised part 13 extends obliquely relative to the Z direction. Specifically, the raised part 13 alternately has a slanted portion where a +Z-side portion thereof is slanted toward the +X side and a slanted portion where a +Z-side portion thereof is slanted toward the −X side. The raised part 13 is formed continuously from the +Z-side end portion to the −Z-side end portion of the heat dissipation fin 14.

Unlike the background art, the heat dissipation fin 14 of the present embodiment does not have slits formed therein. Thus, even if a heat exchanger using the heat dissipation fins 14 is disposed in an easily contaminated environment, such as outdoors or inside a factory, attachment of dirt and the like to the heat dissipation fins 14 can be inhibited.

Figure 3A:
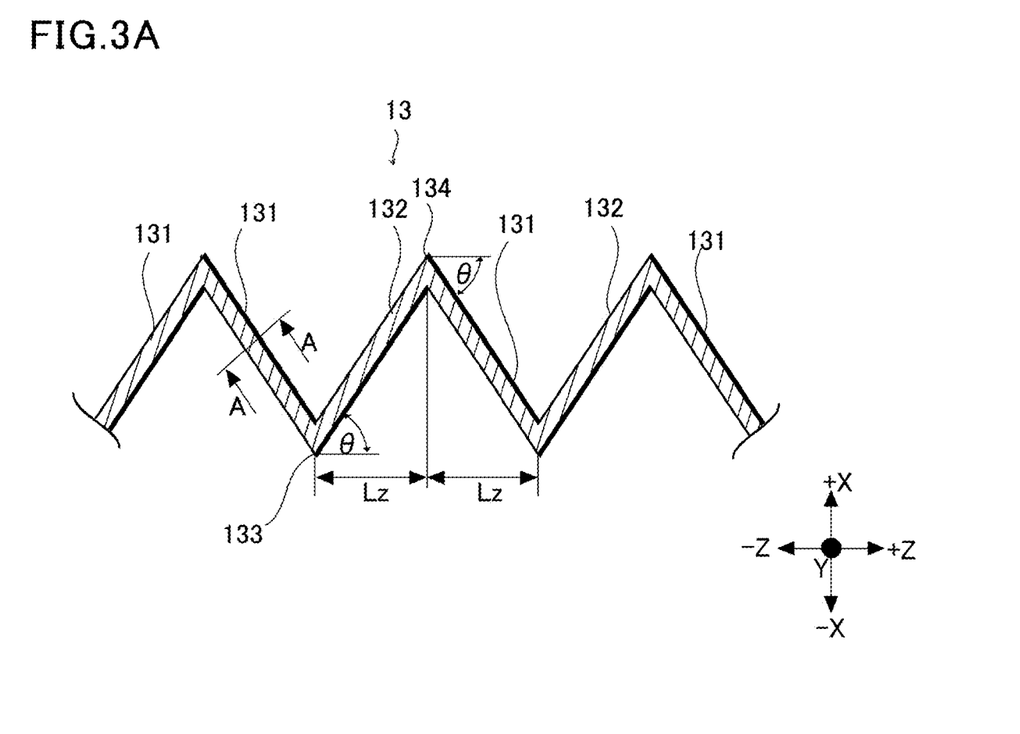
Figure 3B:
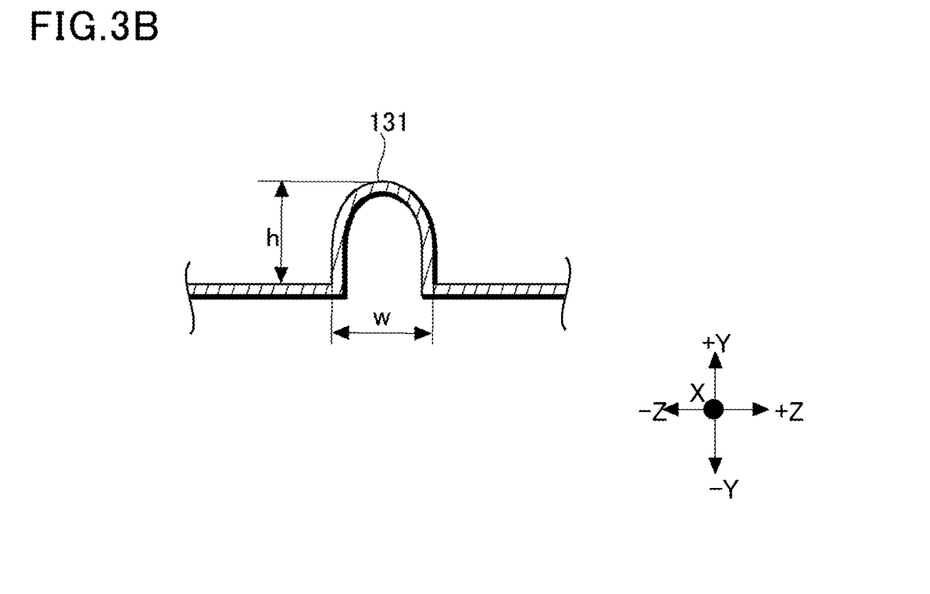

With reference to FIG. 3, the specific shape of the raised part 13 is described. FIG. 3A is a view of the raised part 13 seen from the +Y side, and FIG. 3B is a section taken along a cutting-plane line A-A in FIG. 3A.

Referring to FIG. 3A, the raised part 13 extends in the Z direction in a zigzag manner, forming a meandering shape. In other words, the raised part 13 alternately has a raised portion 131 that extends straight to the +Z side and is slanted to the −X side and a raised portion 132 that extends straight to the +Z side and is slanted to the +X side. With such a configuration, the raised part 13 forms a substantially letter-V shape at an edge portion 133 which is a -X-side edge portion where the raised portion 131 and the raised portion 132 are continuous with each other and at an edge portion 134 which is a +X-side edge portion where the raised portion 131 and the raised portion 132 are continuous with each other.

An angle θ at which the raised portion 131 is slanted from the Z direction is, for example, 55°. A favorable range of the angle θ is from at least 30° to not greater than 80°, and a more favorable range is from at least 40° to not greater than 70°, and a particularly favorable range is from at least 50° to not greater than 60°. When the raised portion 131 has the angle θ slanted from the X direction within the above ranges, heat transfer characteristics can be improved, and also, pressure loss can be reduced, as will be described later.

The length LZ of the raised portion 131 measured in the Z direction is, for example, 4 mm. A favorable range of LZ is from at least 1.5 mm to 6.4 mm, a more favorable range is from at least 2.5 mm to 5.5 mm, and an even more favorable range is from at least 3.0 mm to 5.0 mm. When LZ is a value within those ranges, heat transfer characteristics can be improved, and also, pressure loss can be reduced, as will be described later.

The angle θ at which the raised portion 132 is slanted from the Z direction and the length LZ of the raised portion 132 measured in the Z direction are the same as those of the raised portion 131.

Referring to FIG. 3B, the height h of the raised portion 131 is, for example, 0.9 mm. A favorable range of h is from at least 0.2 mm to 1.5 mm, a more favorable range is from at least 0.4 mm to 1.3 mm, and an even more favorable range is from at least 0.6 mm to 1.1 mm. When h is a value within those ranges, heat transfer characteristics can be improved, and also, pressure loss can be reduced, as will be described later.

The width w of the raised portion 131 is, for example, 2.5 mm. A favorable range of w is from at least 0.6 mm to not greater than 4.5 mm, a more favorable range is from at least 1.0 mm to 4.0 mm, and an even more favorable range is from at least 2.0 mm to 3.0 mm. When w is a value within those ranges, heat transfer characteristics can be improved, and also, pressure loss can be reduced, as will be described later.

Further, the number N of waves in a span direction is calculated from N=Pt/LZ, and an example value of N is from at least 4 to not greater than 16.

Figure 4A:
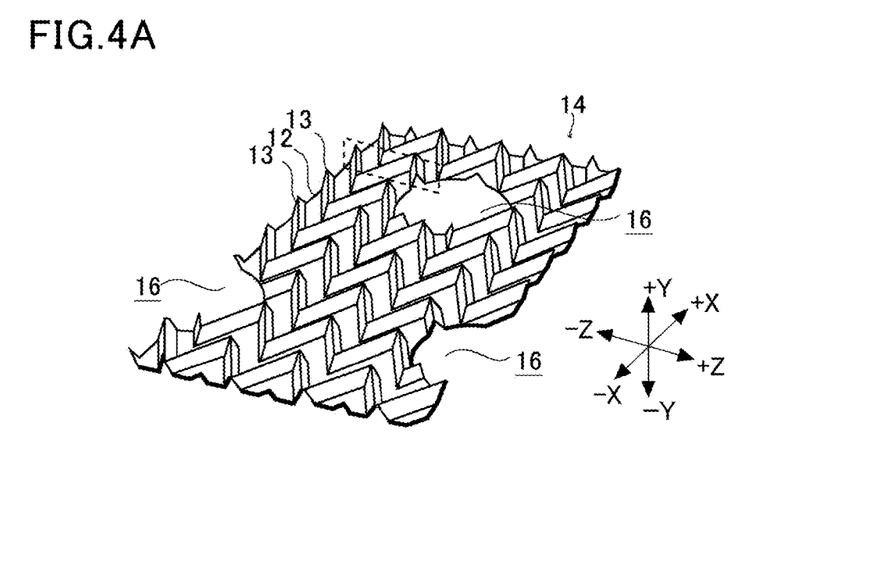
Figure 4B:
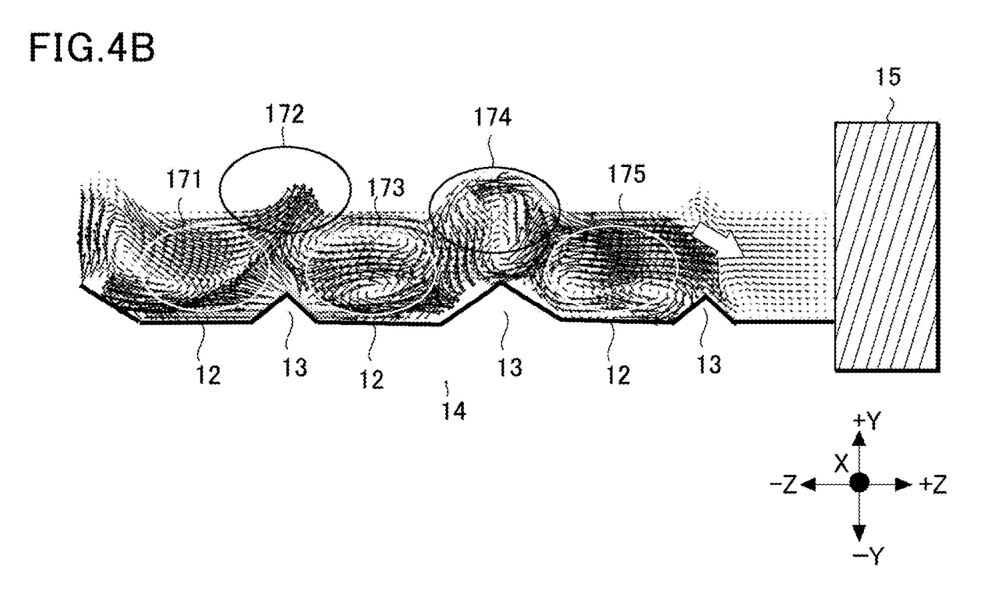

With reference to FIG. 4, a description is given of advantageous effects offered by the heat dissipation fin 14 having the shape described above. FIG. 4A is a perspective view of the heat dissipation fin 14, and FIG. 4B is a diagram showing the flows of fluid in a region surrounded by a dotted line in FIG. 4A. In FIG. 4B, the flow of fluid is shown with a thin solid-line arrow.

Referring to FIG. 4A, the direction of the ridge lines of the raised parts 13 are slanted at a predetermined angle relative to the X direction, which is a fluid flowing direction. Also, as shown in FIG. 3A, the slanting directions of the raised portions 131 and the raised portions 132 constituting the raised part 13 alternate at a constant cycle (LZ shown in FIG. 3A). Also, a portion where the raised portion 131 and the raised portion 132 are continuous with each other forms a letter-V shape.

Consequently, swirls 171 to 175 are formed at the upper surface of the heat dissipation fin 14. The swirls 171, 173, and 175 are formed on the upper surface of a planar part 12 of the heat dissipation fin 14. The planar part 12 is a surface substantially parallel to the flow of fluid. Meanwhile, the swirls 172 and 174 are formed above the raised parts 13. In the swirls 171 to 175, a fluid flows, swirling about a rotation axis parallel to the X-axis. The rotation direction of the swirls 171, 173, and 175 formed above the planar part 12 is opposite from the rotation direction of the swirls 172 and 174 formed above the raised parts 13. Specifically, from the viewpoint in FIG. 4B, the rotation direction of the swirls 171, 173, and 175 is counterclockwise, and the rotation direction of the swirls 172 and 174 is clockwise. Due to this phenomenon, a strong secondary flow is produced in a section perpendicular to the flow direction, promoting heat transfer at the heat dissipation fin 14.

Also, as described with reference to FIG. 3A, the raised part 13 forms a substantially letter-V shape at a portion where the raised portion 131 and the raised portion 132 are continuous with each other. Due to this shape of the raised part 13, a flow of fluid moving around to the back of the heat transfer tube 15 is formed, as will be described later. Thus, a wake behind the heat transfer tube 15 notably decreases, drastically decreasing pressure drag and holding down an increase in pressure loss. A wake is a region behind the heat transfer tube 15 where a fluid stagnates, and heat exchange efficiency is low in a wake.

Further, as shown in FIG. 4B, the sectional shape of the heat dissipation fin 14 is what is called a pulse-wave shape having the planar part 12 and the raised part 13 alternately. Thus, the substantially flat planar parts 12 exist at constant intervals in the fluid flow direction, and a sheer stress (frictional force) is enhanced. As a result, heat transfer between the heat dissipation fin 14 and the fluid is promoted, and an increase in pressure loss is held down.

Further, as is apparent from FIG. 4B, the raised parts 13 protrude only upwards (the +Y direction) and do not protrude downward (the −Y direction). With such a configuration, friction drag at the upper surface of the heat dissipation fin 14 (the surface facing the +Y direction) is larger than the friction drag at the lower surface of the heat dissipation fin 14 (the surface facing the −Y direction).

Figure 5A:
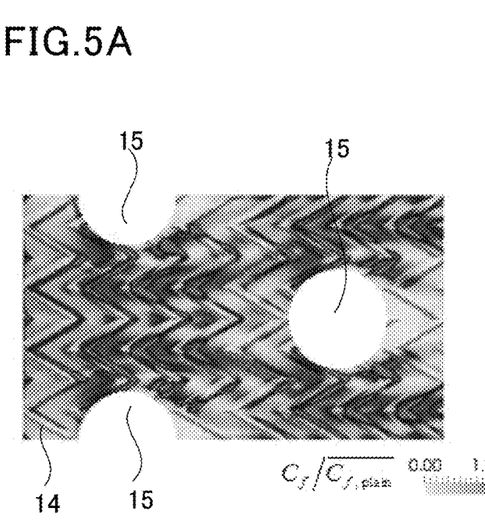
Figure 5B:
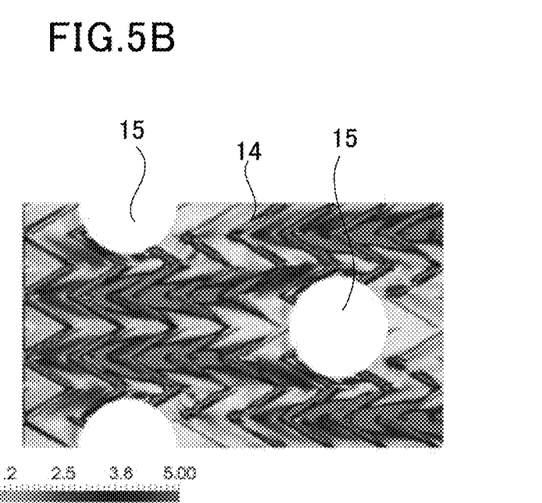

This phenomenon is described with reference to FIG. 5. FIG. 5A shows the distribution of friction coefficient at the lower surface of the heat dissipation fin 14, and FIG. 5B shows the distribution of friction coefficient at the upper surface of the heat dissipation fin 14. In FIGS. 5A and 5B, the density of color indicates the magnitude of the friction coefficient. In a comparison between the distribution chart in FIG. 5A and the distribution chart in FIG. 5B, the friction coefficient at the lower surface of the heat dissipation fin 14 shown in FIG. 5A is relatively small. Thus, the flow of fluid at the upper surface of the heat dissipation fin 14 and the flow of fluid at the lower surface of the heat dissipation fin 14 become asymmetrical, which enhances the flow that moves around to the back of the heat transfer tube 15, reducing the profile drag caused by the existence of the heat transfer tube 15.

Referring back to FIG. 4B, when the heat dissipation fin 14 has the above-described shape, the fluid favorably flows along the upper surface of the heat dissipation fin 14 without separating therefrom while maintaining its laminar flow state at the upper surface of the heat dissipation fin 14. Hence, heat transfer between the heat dissipation fin 14 and the fluid can be promoted.

Figure 6A:
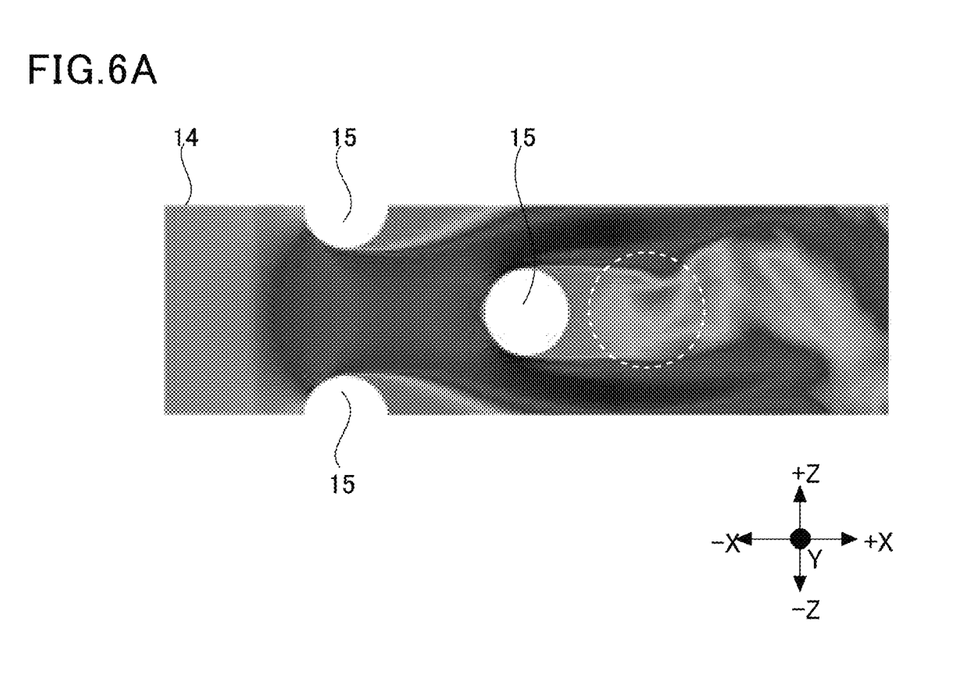
FIG. 6A shows a change in a flow field in a case where the heat dissipation fin is flat.
Figure 6B:
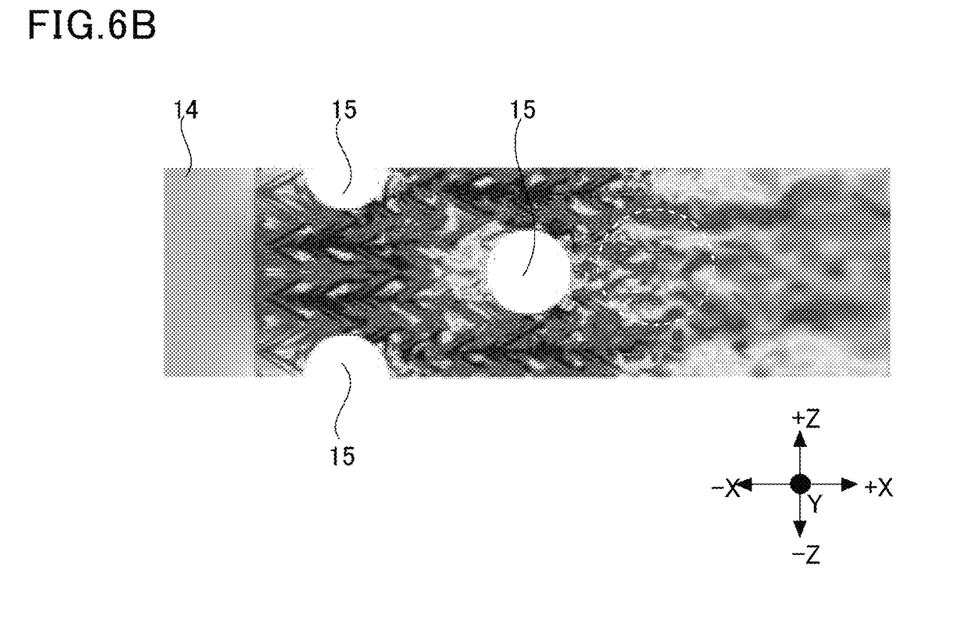
FIG. 6B shows a change in a flow field of the heat dissipation fin according to the embodiment of the present invention.

With reference to FIG. 6, advantageous effects offered by the present embodiment are described. FIG. 6A shows a change in a flow field in a case where the heat dissipation fin 14 is a flat plate, and FIG. 6B shows a change in a flow field in a case where the heat dissipation fin 14 has the above-described raised parts 13 formed thereat. In FIGS. 6A and 6B, the efficiency of heat exchange between the heat dissipation fin 14 and the fluid is low at regions that are light in color.

Referring to FIG. 6A, a large wake is formed at a portion behind the heat transfer tube 15 (the portion surrounded by a white circle), and heat exchange efficiency is low there. This is because heat transfer between the surface of the heat dissipation fin 14 and the fluid is not favorably performed behind the heat transfer tube 15 due to the surface of the heat dissipation fin 14 being flat.

In FIG. 6B, a wake like the one shown in FIG. 6A is not generated at a portion behind the heat transfer tube 15 (the portion surrounded by a white circle), and heat exchange is therefore favorably performed. This demonstrates that when the raised parts 13 of a predetermined shape are formed at the surface of the heat dissipation fin 14 as described above, the fluid flows around to the back of the heat transfer tube 15, and heat transfer is thereby performed favorably between the surface of the heat dissipation fin 14 and the fluid.

Figure 7A:
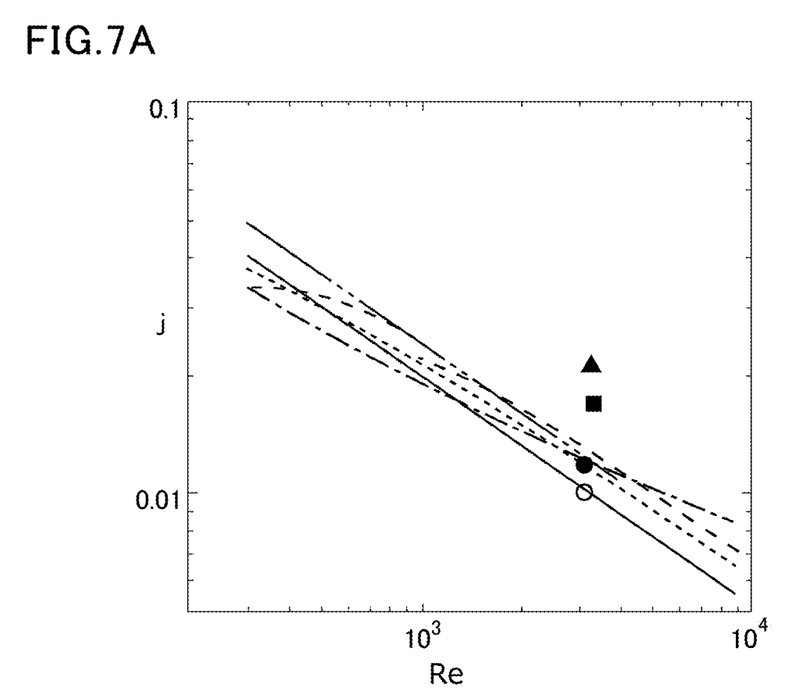
Figure 7B:
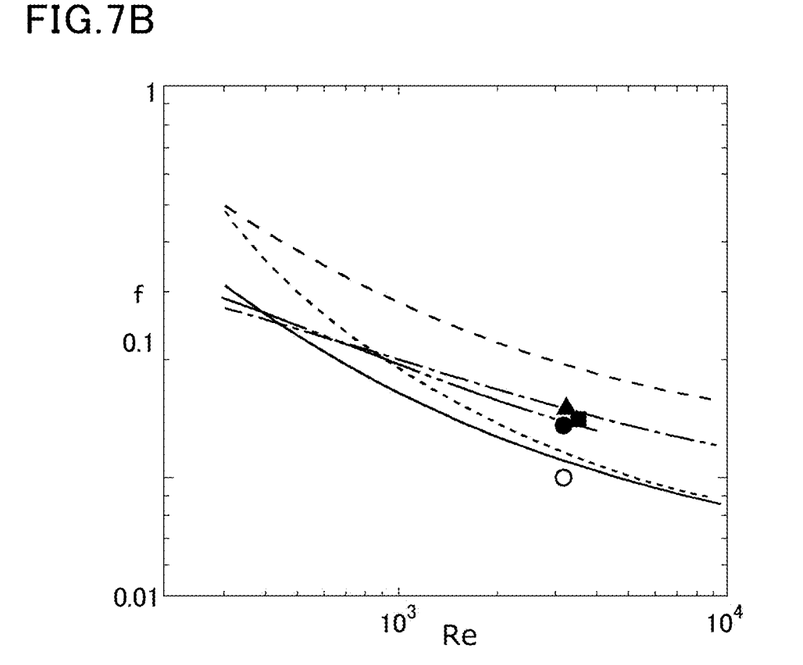

With reference to a graph in FIG. 7, advantageous effects offered by the present embodiment are described. FIG. 7A is a diagram showing the correlation between the Reynolds number and the j-factor of the fluid that exchanges heat with the heat dissipation fin, and FIG. 7B is a diagram showing the correlation between the Reynolds number and the f-factor of the same fluid. The j-factor indicates heat transfer characteristics, and the f-factor indicates pressure loss.

In FIG. 7A, the horizontal axis represents the Reynolds number, and the vertical axis represents the j-factor. The graph here shows the characteristics of heat dissipation fins of various shapes; the solid line indicates the characteristics of a plane fin, the loosely-dotted line indicates the characteristics of a louvered fin, the densely-dotted line indicates the characteristics of a slitted fin, the dash-dot line indicates the characteristics of a wavy fin, and the dash-dot-dot line indicates the characteristics of a fin having dimples formed therein.

Further, the j-factor is measured under the condition that the Reynolds number is a particular value, and this graph shows the value for the plane fin measured under the above condition with a "white-filled circle," the value for the wavy fin (with two wavy parts) with a "black-filled circle," the value for the wavy fin (with four wavy parts) with a "black-filled square," and the heat dissipation fin having the shape according to the present embodiment with a "black-filled triangle."

As is clear from the graph, by using the heat dissipation fin 14 according to the present embodiment, the j-factor can be 107% larger than that of the plane fin, and therefore, heat exchange efficiency can be improved dramatically.

In a graph shown in FIG. 7B, the horizontal axis represents the Reynolds number, and the vertical axis represents the f-factor. As with FIG. 7A, the solid line indicates the characteristics of a plane fin, the loosely-dotted line indicates the characteristics of a louvered fin, the densely-dotted line indicates the characteristics of a slitted fin, the dash-dot line indicates the characteristics of a wavy fin, and the dash-dot-dot line indicates the characteristics of a fin having dimples formed therein. As a result of measuring a f-factor with the Reynolds number being a particular value as in FIG. 7A, the f-factor for the present embodiment indicated with a "black-filled triangle" is 78% larger than that of the plain fin.

Judging from the above, by using the heat dissipation fin 14 of the present embodiment, an increase in the j-factor can be 107% and an increase in the f-factor can be only 78%, compared to those of the plane fin. Thus, an increase in pressure loss can be suppressed while improving heat transfer performance. Thus, by using the heat dissipation fin 14 thus configured in a heat exchanger, heat exchange can be performed efficiently with low operational energy. Further, a heat exchanger using the heat dissipation fin 14 according to the present embodiment can reduce frosting and allows easy defrosting.

Figure 9A:
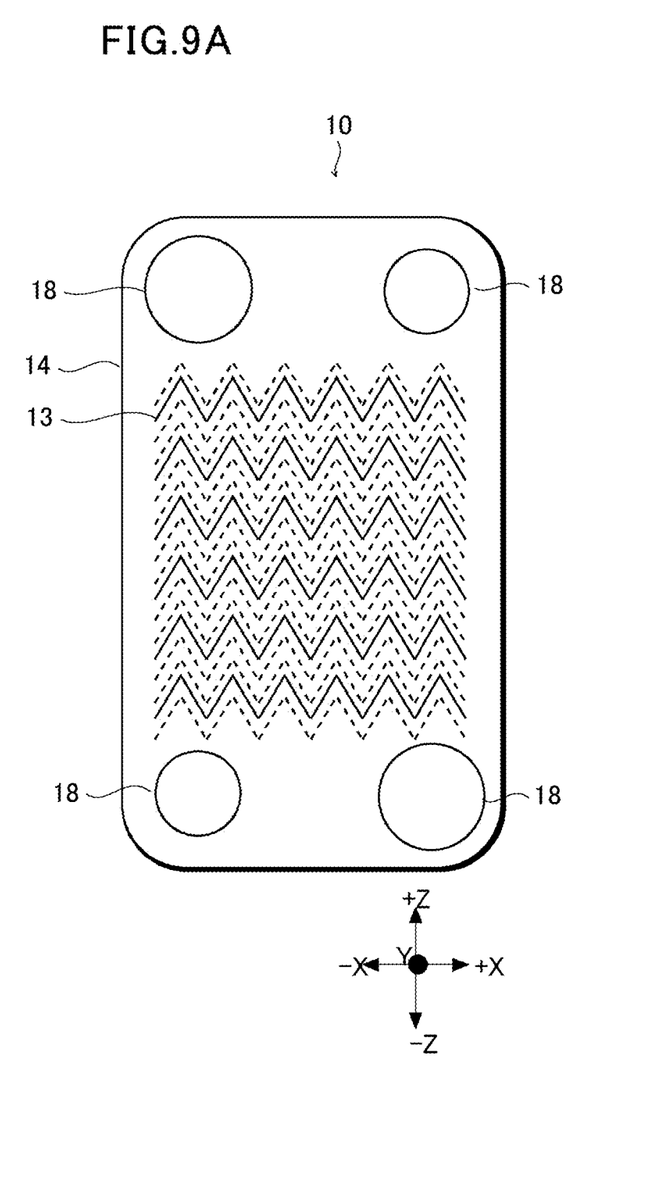
Figure 9B:
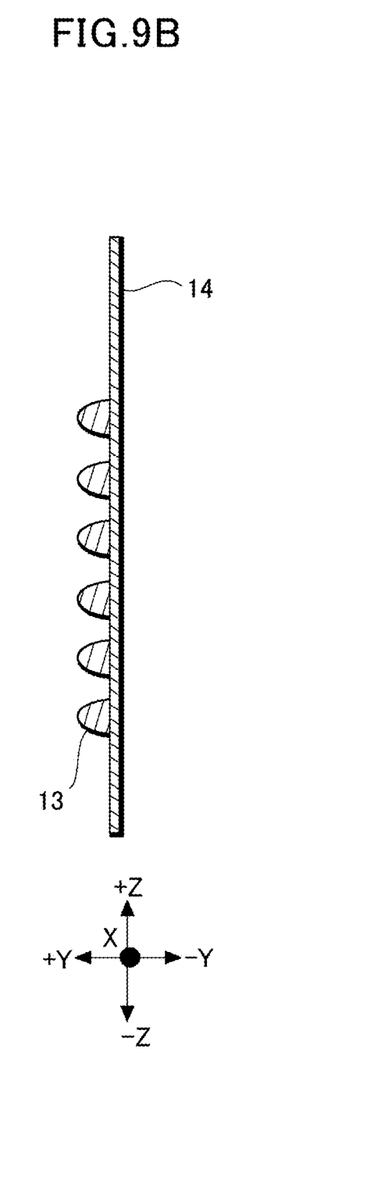

With reference to FIG. 9, the configuration of a heat exchanger 10 according to a different mode is described. FIG. 9A is a view of the heat exchanger 10 seen in the Y direction, and FIG. 9B is a view of the heat exchanger 10 seen in the X direction.

Referring to FIGS. 9A and 9B, the basic configuration of the heat exchanger 10 shown here is the same as that of the one shown in FIG. 1, and the heat exchanger 10 is configured as a plate heat exchanger. In a plate heat exchanger, a plurality of heat exchangers 10 are stacked and arranged at predetermined intervals. Also, in the vicinity of each of the four corners of the heat exchangers 10, a hole portion 18 is formed to allow a fluid-flowing tube to penetrate therethrough.

While the heat exchanger 10 is in operation, a high-temperature fluid and a low-temperature fluid flow in each heat exchanger 10 in the Y-axis direction. In the heat exchanger 10, the raised parts 13 are formed at predetermined intervals in such a manner as to form a substantially letter-V shape with respect to the flow of the high-temperature fluid or the low-temperature fluid. With such a configuration, the high-temperature fluid and the low-temperature fluid can effectively exchange heat with the heat exchanger 10.

Figure 10A:
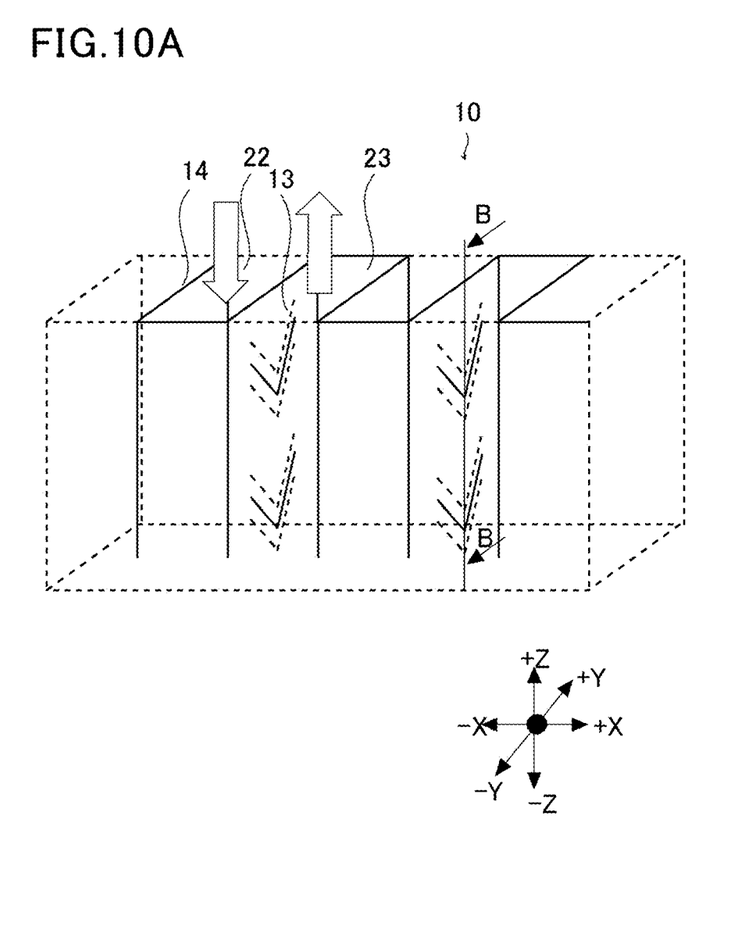
Figure 10B:
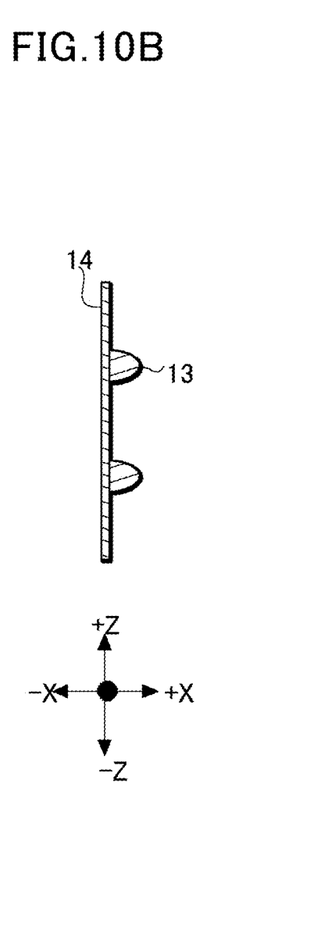

Referring to FIG. 10, the heat dissipation fin 14 here is formed in a substantially corrugated manner. FIG. 10A is a perspective view of the heat dissipation fins 14, and FIG. 10B is a sectional view taken along a cutting-plane line B-B in FIG. 10A.

Referring to FIGS. 10A and 10B, when the heat dissipation fin 14 is seen in the Z direction, the heat dissipation fin 14 is formed in a corrugated shape in the X direction. The raised parts 13 are formed on the surface of the heat dissipation fin 14 facing +X. In this way, the corrugated heat exchanger 10 can effectively exchange heat with the fluids.

As shown in FIG. 10A, in the heat exchanger 10, high-temperature-side flow channels 22 and low-temperature-side flow channels 23 are formed alternately, arranged in the X direction with the heat dissipation fin 14 interposed therebetween. Also, the raised parts 13 are formed to protrude toward the high-temperature-side flow channels 22 and are also formed to protrude toward the low-temperature-side flow channels 23. Here, a fluid at relatively high temperature flows downward in the high-temperature-side flow channel 22, and a fluid at relatively low temperature flows upward in the low-temperature-side flow channel 23. In this way, effective heat exchange can be performed between the high-temperature fluid flowing through the high-temperature-side flow channel 22 and the low-temperature fluid flowing through the low-temperature-side flow channel 23 via the heat dissipation fin 14.

Figure 11A:
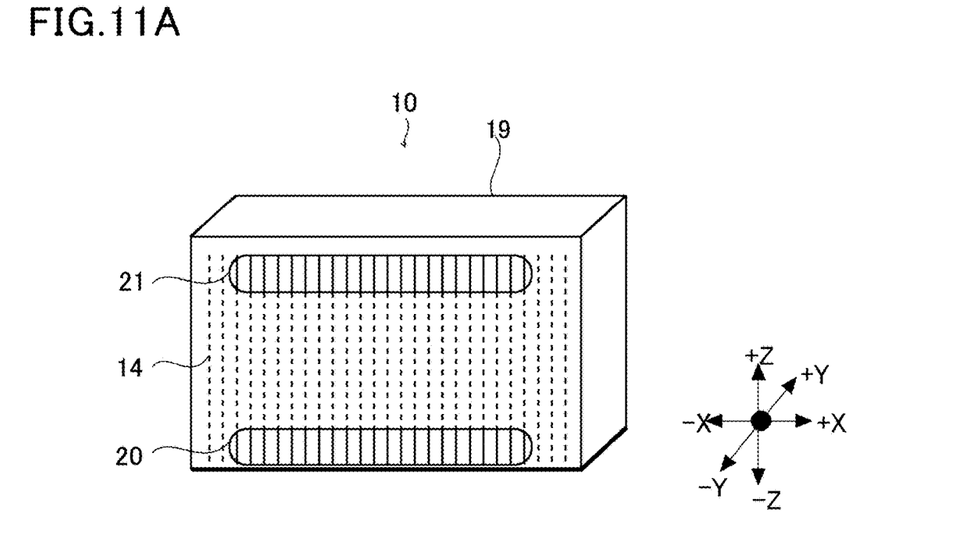
Figure 11B:
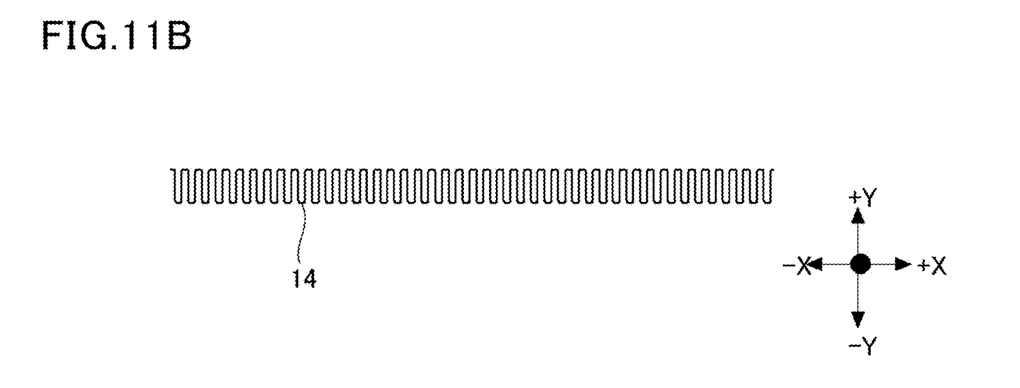

FIG. 11 is a diagram showing the heat exchanger 10 having a casing 19. FIG. 11A is a perspective view of the heat exchanger 10, and FIG. 11B is a top view of only the heat dissipation fin 14 taken out.

Referring to FIG. 11A, the heat dissipation fins 14 are housed in the casing 19. On the side surface of the heat exchanger 10 facing the −Y side, an introduction port 20 is formed at the lower edge side, and a discharge port 21 is formed at the upper edge side. For example, a low-temperature fluid is introduced into the casing 19 through the introduction port 20, and the low-temperature fluid after exchanging heat with the heat dissipation fins 14 is discharged to the outside through the discharge port 21.

Although not shown, an introduction port and a discharge port are also formed in the side surface of the casing 19 facing the +Y side, and a high-temperature fluid is introduced into the casing 19 through the introduction port, and the high-temperature fluid after exchanging heat with the heat dissipation fins 14 is discharged to the outside through the discharge port.

Although the embodiment of the present invention has thus been described above, the present invention is not limited to this and can be modified without departing from the gist of the present invention. Also, the above-described modes can be combined with each other.

The heat dissipation fin 14 described above is applicable not only to the heat exchanger 10, but also to, for example, a crossflow heat exchanger or a heat exchanger for automobiles, i.e., a condenser, an evaporator, a radiator, or the like.

REFERENCE SIGNS LIST 10 heat exchanger
12 planar part
13 raised part
131 raised portion
132 raised portion
133 edge portion
134 edge portion
14 heat dissipation fin
15 heat transfer tube
16 hole portion 171 swirl
172 swirl
173 swirl
174 swirl
175 swirl
18 hole portion
19 casing
20 introduction port
21 discharge port
22 high-temperature-side flow channel
23 low-temperature-side flow channel

The invention claimed is:

1. A heat exchange method for exchanging heat with a fluid by using a heat exchanger, wherein
the heat exchanger includes:
a plurality of heat dissipation fins that are arranged at constant intervals and exchange heat with the fluid; and
a heat transfer tube that is thermally coupled with the heat dissipation fins and allows a heat medium to flow therein, the heat medium transporting heat energy,
when a direction that is parallel to surfaces of the heat dissipation fins and is along a flow of the fluid is a first direction,
a direction that is opposite from the first direction is a second direction,
a direction that is perpendicular to the surfaces of the heat dissipation fins and is orthogonal to the first direction is a third direction,
a direction that is opposite from the third direction is a fourth direction,
a direction that is parallel to the surfaces of the heat dissipation fins and is orthogonal to the first direction is a fifth direction, and
a direction that is opposite from the fifth direction is a sixth direction, the heat dissipation fins each include
a planar part that is a flat surface substantially parallel to the first direction, and
a raised part that continues with the planar part and protrudes only with respect to the third direction,
a plurality of shapes each being a combination of the planar part and the raised part are formed at substantially constant intervals along the first direction,
the raised part alternately has a first raised portion slanted toward the fifth direction along the first direction and a second raised portion slanted toward the sixth direction along the first direction,
a portion where the first raised portion and the second raised portion are continuous with each other forms a substantially letter-V shape,
the fluid flows along the planar part and the raised part, so that the heat dissipation fins and the fluid exchange heat,
the flow of the fluid forms a first swirl near the planar part and forms a second swirl near the raised part, and
a rotation direction of the fluid in the first swirl and a rotation direction of the fluid in the second swirl are opposite from each other,
wherein
the flow of the fluid at a surface of the heat dissipation fin that faces in the third direction and the flow of the fluid at a surface of the heat dissipation fin that faces in the fourth direction become asymmetrical, which enhances the flow that moves around to a back of the heat transfer tube, reducing a profile drag caused by an existence of the heat transfer tube.

2. The heat exchange method according to claim 1, wherein the first swirl is formed closer to the heat dissipation fins than the second swirl.

3. The heat exchange method according to claim 1, wherein the fluid flows along the planar part and the raised part while maintaining a laminar flow state.

* * * * *